(12) United States Patent
Nicholson et al.

(10) Patent No.: US 8,315,635 B2
(45) Date of Patent: Nov. 20, 2012

(54) RE-ROUTING CALLS FROM MOBILE STATIONS

(75) Inventors: Christopher Nicholson, Seffner, FL (US); Kenneth Wayne Hammer, Lutz, FL (US)

(73) Assignee: Syniverse Technologies, LLC

( * ) Notice: Subject to any disclaimer, the term of this patent is extended or adjusted under 35 U.S.C. 154(b) by 34 days.

(21) Appl. No.: 12/941,179

(22) Filed: Nov. 8, 2010

(65) Prior Publication Data

US 2012/0115490 A1    May 10, 2012

(51) Int. Cl.
*H04W 40/00* (2009.01)
(52) U.S. Cl. ............... 455/445; 455/432.1; 370/241
(58) Field of Classification Search ............... 455/445, 455/411, 410, 433, 461, 414.1, 404.1, 426.1, 455/554.1; 379/229, 219, 230, 45, 220.1; 380/247
See application file for complete search history.

(56) References Cited

U.S. PATENT DOCUMENTS

| | | | | |
|---|---|---|---|---|
| 5,884,179 | A | * | 3/1999 | Patel ............... 455/445 |
| 2003/0031165 | A1 | | 2/2003 | O'Brien, Jr. |
| 2005/0130649 | A1 | * | 6/2005 | Kirby ............... 455/432.1 |
| 2005/0186960 | A1 | | 8/2005 | Jiang |
| 2006/0205404 | A1 | * | 9/2006 | Gonen et al. ............... 455/432.1 |
| 2006/0258330 | A1 | * | 11/2006 | Guedalia et al. ............... 455/405 |
| 2008/0032695 | A1 | * | 2/2008 | Zhu et al. ............... 455/442 |
| 2008/0056235 | A1 | | 3/2008 | Albina et al. |
| 2008/0239968 | A1 | * | 10/2008 | Olsen et al. ............... 370/241 |
| 2009/0073960 | A1 | | 3/2009 | Kalaboukis |
| 2010/0080128 | A1 | | 4/2010 | Hovey et al. |

FOREIGN PATENT DOCUMENTS

| | | |
|---|---|---|
| WO | WO 2006/038894 | 4/2006 |
| WO | WO 2006038894 A1 * | 4/2006 |
| WO | WO 2007/131269 | 11/2007 |

OTHER PUBLICATIONS

Office Action dated Oct. 27, 2011, for U.S. Appl. No. 12/941,538.
International Search Report and Written Opinion of the International Searching Authority dated Dec. 29, 2011, for Application No. PCT/US2011/054681.
Office Action dated Feb. 23, 2012 for U.S. Appl. No. 12/941,558, filed Nov. 8, 2010.

* cited by examiner

*Primary Examiner* — Jean Gelin
*Assistant Examiner* — Mahendra Patel
(74) *Attorney, Agent, or Firm* — Alston & Bird LLP

(57) ABSTRACT

Systems, methods, apparatus, and computer program products are provided for re-routing calls from mobile stations. For example, in one embodiment, a call from a mobile station to a non-local number can be re-routed to a local number. The local number can then be used to communicate with a call server to deliver the re-routed call to the non-local number.

25 Claims, 10 Drawing Sheets

RE-ROUTING CALLS FROM MOBILE STATIONS

BACKGROUND

Home operators often have little control over the cost, quality, and roaming experiences of their customers. For example, when customers are roaming, visited operators can charge high prices for calls, while providing poor-quality service. Thus, a need exists to provide home operators with greater control over the cost, quality, and roaming experiences of their customers.

BRIEF SUMMARY

In general, embodiments of the present invention provide systems, methods, apparatus, and computer program products for re-routing calls from mobile stations.

In accordance with one aspect, a method for re-routing a call from a mobile station is provided. In one embodiment, the method comprises (1) receiving an initiation message indicating that a mobile station has initiated a call to a non-local number; (2) determining whether the call from the mobile station to the non-local number is to be re-routed to a local number; and (3) after determining that the call from the mobile station to the non-local number is to be re-routed to a local number, generating and transmitting a re-routing message. In one embodiment, the method may also comprise (4) receiving a request to establish a call session originating from the local number; and (5) after receiving the request to establish a call session originating from the local number, establishing a call session from the mobile station to the non-local number.

In accordance with yet another aspect, an apparatus comprising at least one processor and at least one memory including computer program code is provided. In one embodiment, the at least one memory and the computer program code may be configured to, with the processor, cause the apparatus to at least (1) receive an initiation message indicating that a mobile station has initiated a call to a non-local number; (2) determine whether the call from the mobile station to the non-local number is to be re-routed to a local number; and (3) after determining that the call from the mobile station to the non-local number is to be re-routed to a local number, generate and transmit a re-routing message. The at least one memory and the computer program code may also be configured to, with the processor, cause the apparatus to at least (4) receive a request to establish a call session originating from the local number; and (5) after receiving the request to establish a call session originating from the local number, establish a call session from the mobile station to the non-local number.

In accordance with yet another aspect, a computer program product for re-routing a call from a mobile station is provided. The computer program product may comprise at least one computer-readable storage medium having computer-readable program code portions stored therein, the computer-readable program code portions comprising executable portions configured to (1) receive an initiation message indicating that a mobile station has initiated a call to a non-local number; (2) determine whether the call from the mobile station to the non-local number is to be re-routed to a local number; and (3) after determining that the call from the mobile station to the non-local number is to be re-routed to a local number, generate and transmit a re-routing message. In one embodiment, the computer-readable program code portions may also comprise executable portions configured to (4) receive a request to establish a call session originating from the local number; and (5) after receiving the request to establish a call session originating from the local number, establish a call session from the mobile station to the non-local number.

In accordance with still another aspect, a method for establishing a call session of a re-routed call is provided. In one embodiment, the method comprises (1) receiving a request to establish a call session originating from a local number, wherein (a) a mobile station has initiated a call to a non-local number and (b) the call from the mobile station was re-routed from the non-local number to the local number; and (2) identifying data corresponding to the local number stored in association with (a) data corresponding to the non-local number and (b) data corresponding to the mobile station. In one embodiment, the method may also comprise (3) after identifying data corresponding to the local number, generating and transmitting a request to establish a call session to the non-local number; and (4) establishing a call session from the mobile station to the non-local number.

In accordance with yet another aspect, an apparatus comprising at least one processor and at least one memory including computer program code is provided. In one embodiment, the at least one memory and the computer program code may be configured to, with the processor, cause the apparatus to at least (1) receive a request to establish a call session originating from a local number, wherein (a) a mobile station has initiated a call to a non-local number and (b) the call from the mobile station was re-routed from the non-local number to the local number; and (2) identify data corresponding to the local number stored in association with (a) data corresponding to the non-local number and (b) data corresponding to the mobile station. The at least one memory and the computer program code may also be configured to, with the processor, cause the apparatus to at least (3) after identifying data corresponding to the local number, generate and transmit a request to establish a call session to the non-local number; and (4) establish a call session from the mobile station to the non-local number.

In accordance with yet another aspect, a computer program product for establishing a call session of a re-routed call is provided. The computer program product may comprise at least one computer-readable storage medium having computer-readable program code portions stored therein, the computer-readable program code portions comprising executable portions configured to (1) receive a request to establish a call session originating from a local number, wherein (a) a mobile station has initiated a call to a non-local number and (b) the call from the mobile station was re-routed from the non-local number to the local number; and (2) identify data corresponding to the local number stored in association with (a) data corresponding to the non-local number and (b) data corresponding to the mobile station. In one embodiment, the computer-readable program code portions may also comprise executable portions configured to (3) after identifying data corresponding to the local number, generate and transmit a request to establish a call session to the non-local number; and (4) establish a call session from the mobile station to the non-local number.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 9:
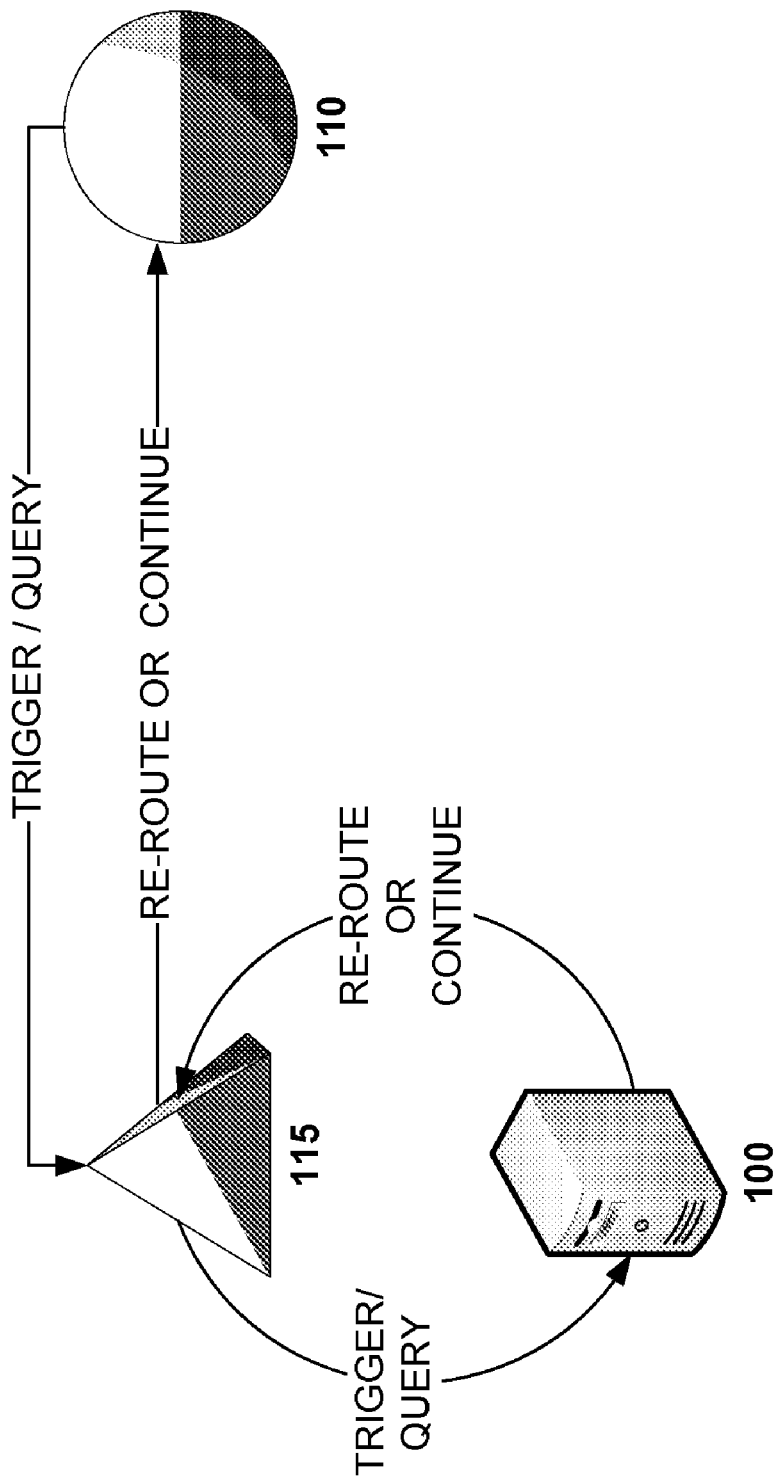

FIG. 9 provides an exemplary communication flow for re-routing calls.

Figure 10:
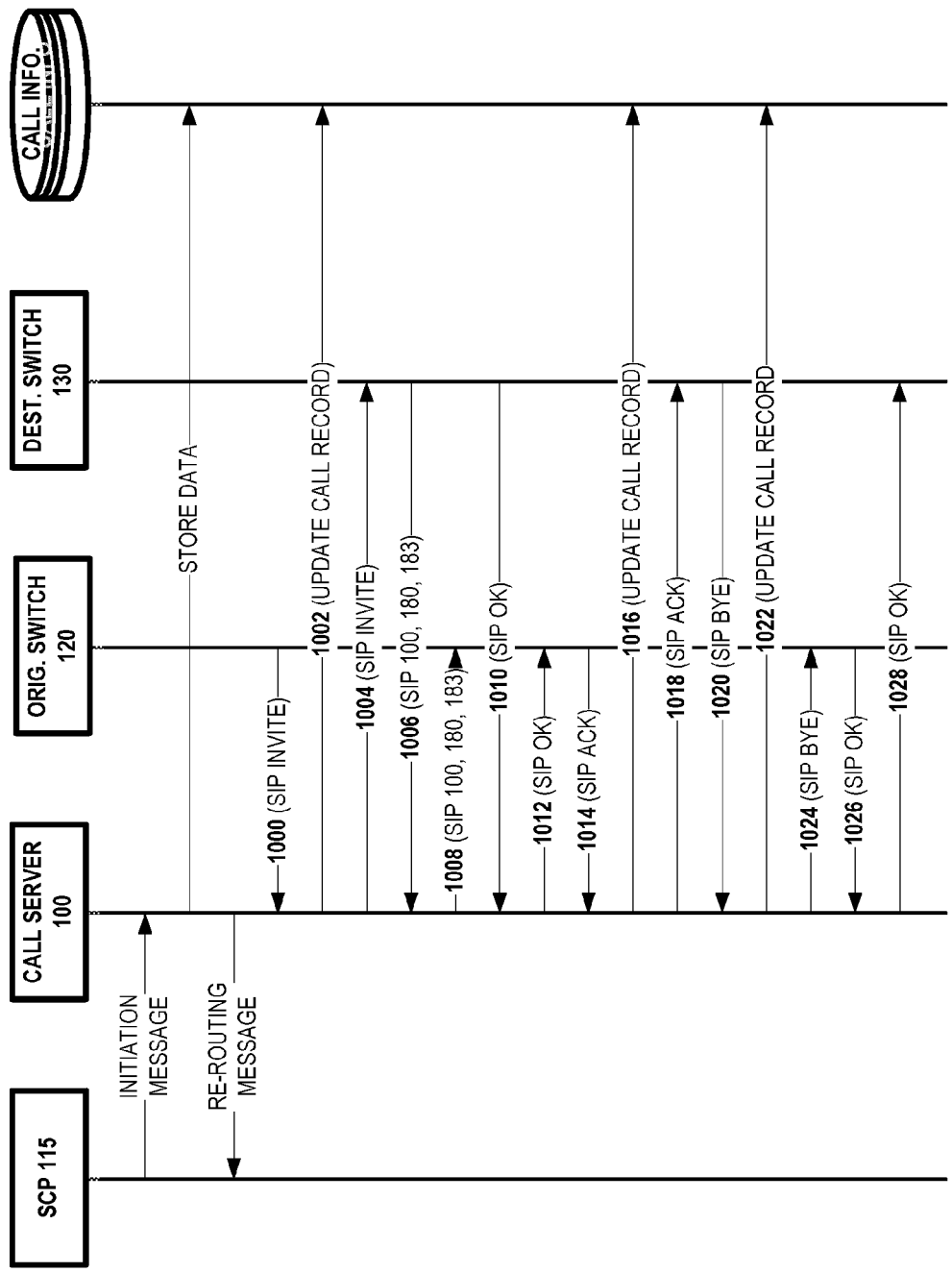

FIG. 10 provides an exemplary communication flow for call sessions.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout. The terms "illustrative" and "exemplary" are used to be examples with no indication of quality level.

I. METHODS, APPARATUS, SYSTEMS, AND COMPUTER PROGRAM PRODUCTS

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. EXEMPLARY SYSTEM ARCHITECTURE

Figure 1:
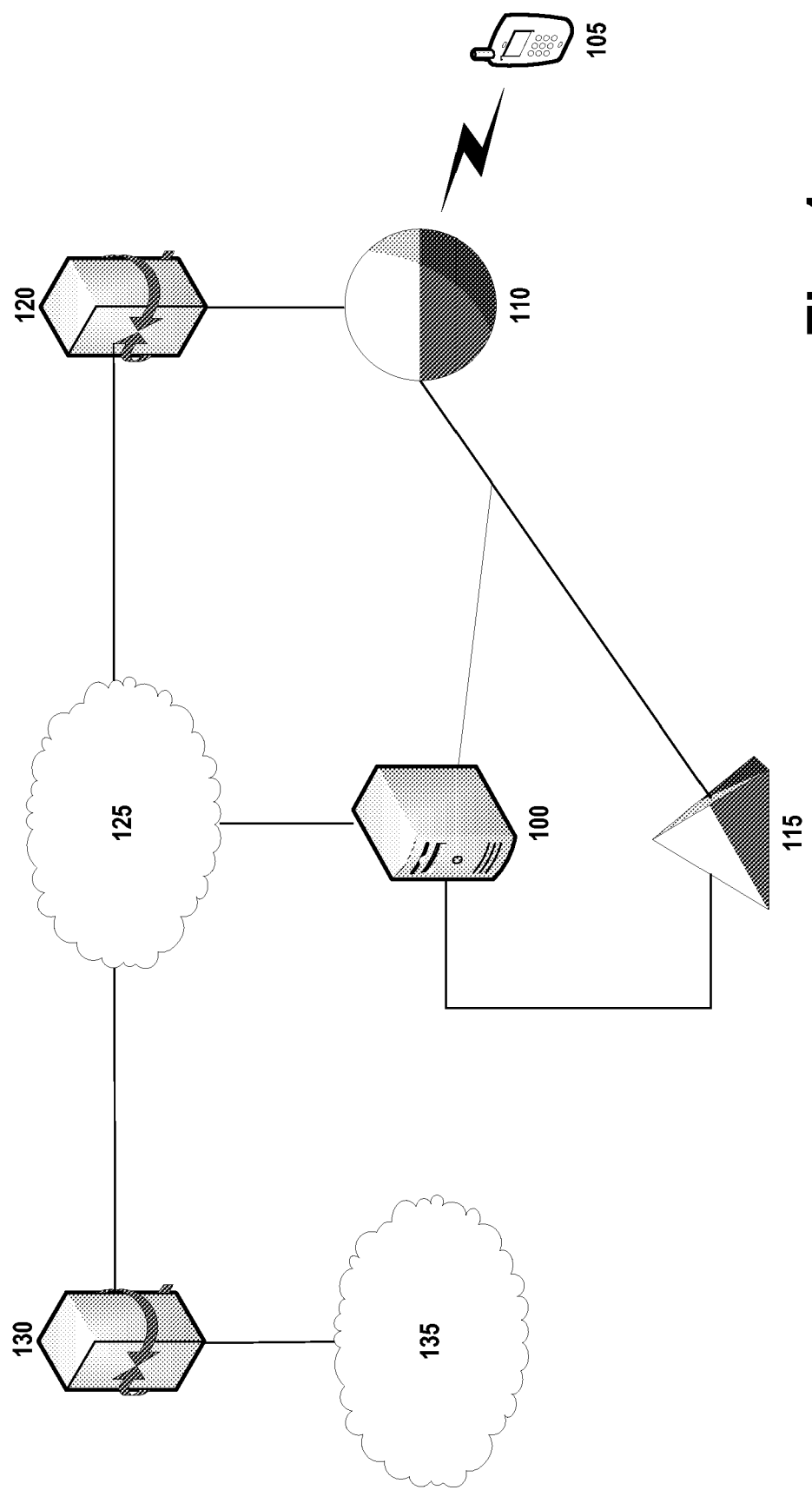
FIG. 1 is an overview of a communication system that can be used to practice various embodiments of the present invention.

FIG. 1 provides an illustration of a communication system that can be used in conjunction with various embodiments of the present invention. As shown in FIG. 1, the communication system may include one or more call servers 100, one or more mobile stations 105, one or more mobile switching centers ("MSC") 110, one or more service control points ("SCP") 115, one or more origination switches 120, one or more Internet Protocol packet exchange networks ("IPX") 125, one or more destination switches 130, and one or more public telephone networks ("PSTN") 135. Each of the components of the communication system may be in electronic communication with, for example, one another over the same or different wireless or wired networks including, for example, a wired or wireless Personal Area Network ("PAN"), Local Area Network ("LAN"), Metropolitan Area Network ("MAN"), Wide Area Network ("WAN"), or the like. Additionally, while FIG. 1 illustrates certain communication system entities as separate, standalone entities, the various embodiments are not limited to this particular architecture.

1. Exemplary Call Server

Figure 3:
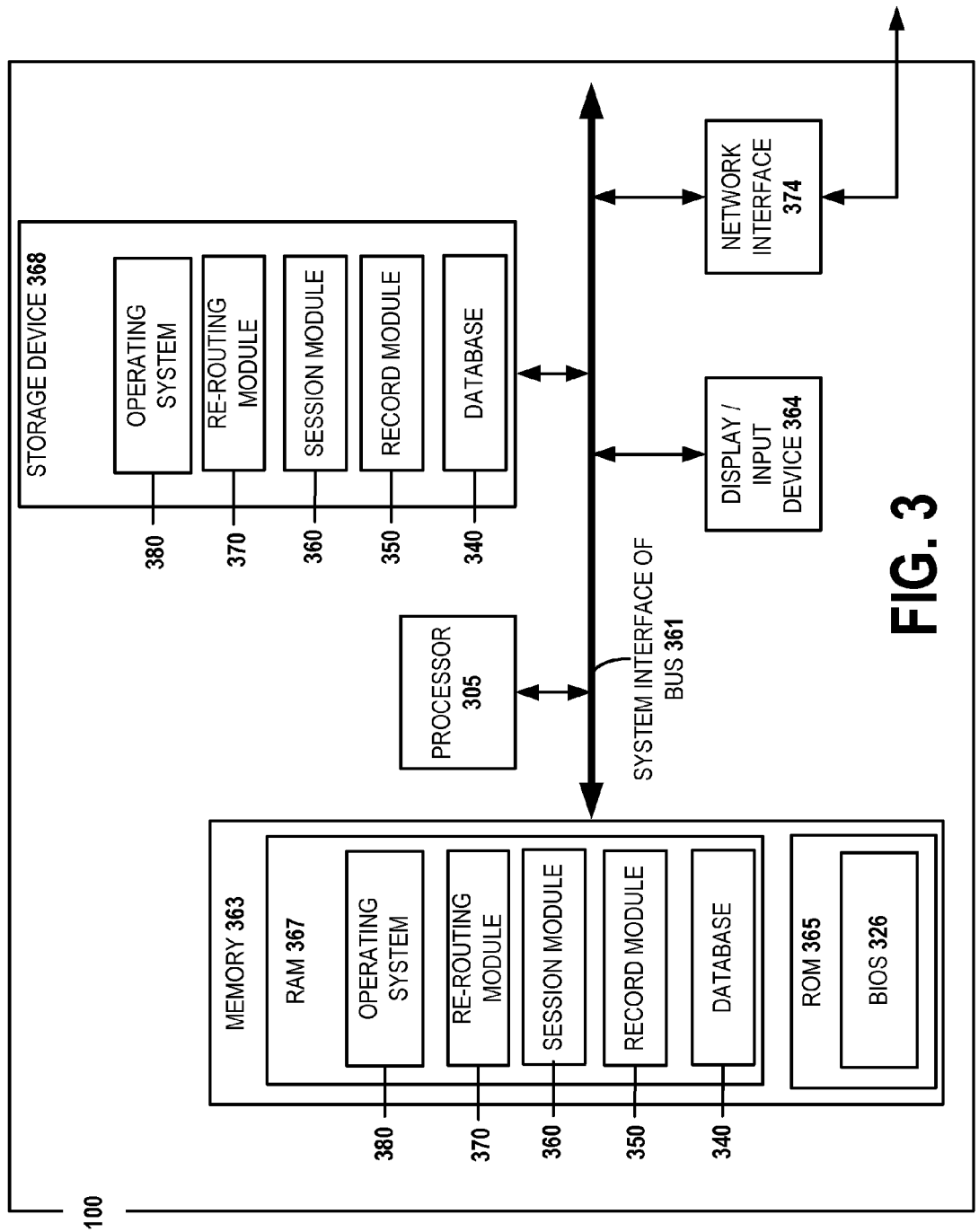
FIG. 3 is an exemplary schematic diagram of a call server according to one embodiment of the present invention.

FIG. 3 provides a schematic of a call server 100 according to one embodiment of the present invention. In general, the term "server" may refer to, for example, any computer, computing device, mobile phone, desktop, notebook or laptop, distributed system, server, blade, gateway, switch, processing device, or combination of processing devices adapted to perform the functions described herein. As will be understood from this figure, in one embodiment, the call server 100 includes a processor 305 that communicates with other elements within the call server 100 via a system interface or bus 361. The processor 305 may be embodied in a number of different ways. For example, the processor 305 may be embodied as a processing element, a coprocessor, a controller or various other processing devices including integrated circuits such as, for example, an application specific integrated circuit ("ASIC"), a field programmable gate array ("FPGA"), a hardware accelerator, or the like.

In an exemplary embodiment, the processor 305 may be configured to execute instructions stored in the device memory or otherwise accessible to the processor 305. As such, whether configured by hardware or software methods, or by a combination thereof, the processor 305 may represent an entity capable of performing operations according to embodiments of the present invention while configured accordingly. A display device/input device 364 for receiving and displaying data may also be included in the call server 100. This display device/input device 364 may be, for example, a keyboard or pointing device that is used in combination with a monitor. The call server 100 further includes memory 363, which may include both read only memory ("ROM") 365 and random access memory ("RAM") 367. The call server's ROM 365 may be used to store a basic input/output system ("BIOS") 326 containing the basic routines that help to transfer information to the different elements within the call server 100.

In addition, in one embodiment, the call server 100 includes at least one storage device 368, such as a hard disk drive, a CD drive, and/or an optical disk drive for storing information on various computer-readable media. The storage device(s) 368 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 368 may be connected to the system bus 361 by an appropriate interface.

Furthermore, a number of program modules may be stored by the various storage devices 368 and/or within RAM 367. Such program modules may include an operating system 380, a re-routing module 370, a session module 360, and a record module 350. These modules may control certain aspects of the operation of the call server 100 with the assistance of the processor 305 and operating system 380—although their functionality need not be modularized. In addition to the program modules, the call server 100 may store or be connected to one or more databases (e.g., database 340) with one or more tables stored therein.

Also located within the call server 100, in one embodiment, is a network interface 374 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the call server 100 may be configured to communicate via wireless external communication networks using any of a variety of protocols, such as 802.11, general packet radio service ("GPRS"), code division multiple access ("CDMA"), wideband code division multiple access ("W-CDMA"), or any other wireless protocol.

It will be appreciated that one or more of the call server's 100 components may be located remotely from other call server 100 components, and there may be multiple geographically diverse call servers 100. Furthermore, one or more of the components may be combined and additional components performing functions described herein may be included in the call server 100.

2. Exemplary Mobile Station

Figure 4:
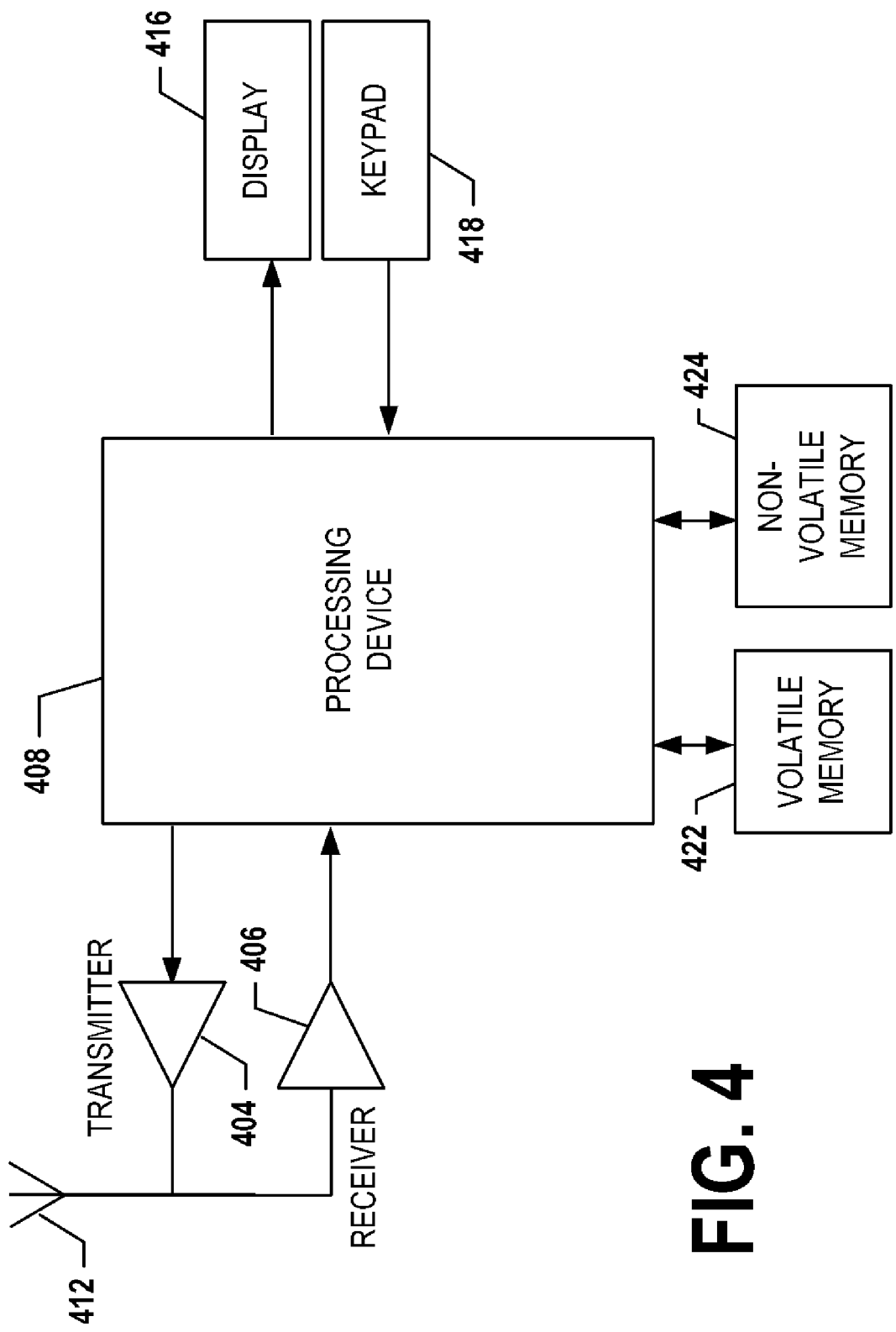
FIG. 4 is an exemplary schematic diagram of a mobile station according to one embodiment of the present invention.

FIG. 4 provides an illustrative schematic representative of a mobile station 105 that can be used in conjunction with the embodiments of the present invention. As shown in FIG. 4, the mobile station 105 can include an antenna 412, a transmitter 404, a receiver 406, and a processing device 408 (e.g., a processor, controller, and/or the like) that provides signals to and receives signals from the transmitter 404 and receiver 406, respectively.

The signals provided to and received from the transmitter 404 and the receiver 406, respectively, may include signaling information in accordance with an air interface standard of applicable wireless systems. In this regard, the mobile station 105 may be capable of operating with one or more air interface standards, communication protocols, modulation types, and access types. More particularly, the mobile station 105 may operate in accordance with any of a number of second-generation ("2G") communication protocols, third-generation ("3G") communication protocols, fourth-generation ("4G"), Global System for Mobile Communications ("GSM"), Universal Mobile Telecommunications System ("UMTS"), Long Term Evolution ("LTE"), LTE-Advanced ("LTE-A") GPRS, W-CDMA, CDMA communication protocols, and/or the like. Further, for example, the mobile station 105 may operate in accordance with any of a number of different wireless networking techniques, including Bluetooth, IEEE 802.11 ("Wi-Fi"), 802.16 ("WiMAX"), ultra wideband ("UWB"), and/or the like. Via these communication standards and protocols, the mobile station 105 can communicate with various other entities using concepts such as Unstructured Supplementary Service Data ("USSD"), Short Message Service ("SMS"), Dual-Tone Multi-Frequency Signaling ("DTMF"), and/or Subscriber Identity Module Dialer ("SIM dialer"). The mobile station 105 can also download changes, add-ons, and updates, for instance, to its firmware, software (e.g., including modules), and operating system.

The mobile station 105 may also comprise a user interface (that can include a display 416 coupled to a processing device 408) and/or a user input interface (coupled to the processing device 408). The user input interface can comprise any of a number of devices allowing the mobile station 105 to receive data, such as a keypad 418, a touch display, voice or motion interfaces, or other input device. In embodiments including a keypad 418, the keypad 418 can include the conventional numeric (0-9) and related keys (#, *), and other keys used for operating the mobile station 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile station 105 can also include volatile memory 422 and/or non-volatile memory 424, which can be embedded and/or may be removable. For example, the non-volatile memory may be embedded or removable MMCs, secure digital SD memory cards, Memory Sticks, EEPROM, flash memory, hard disk, or the like. The memory can store any of a number of pieces or amount of information and data used by the mobile station 105 to implement the functions of the mobile station 105. The memory can also store content, such as computer program code for an application and/or other computer programs.

3. Exemplary Mobile Switching Center

As shown in FIG. 1, in one embodiment, a mobile switching center ("MSC") 110 can be used in conjunction with embodiments of the present invention. The MSC 110 may include one or more components that are functionally similar to those described above with respect to the call server 100 and/or the mobile station 105. For example, in one embodiment, the MSC 110 may include (1) one or more processing elements, (2) memory, (3) a network interface, (4) an antenna, (5) transceiver, and/or (6) various other components. In one embodiment, although not shown, the MSC 110 may be connected to one or more radio access networks ("RAN"), including one or more one or more base station controllers ("BSC") and one or more base transceiver stations ("BTS").

As will be recognized, the MSC 110 may support a variety of network types (e.g., wired, wireless, and/or the like) and various communications standards and protocols (e.g., GSM, UMTS, CDMA, GPRS, W-CDMA, Customized Application of Mobile Enhanced Logic ("CAMEL"), Session Initiation Protocol ("SIP"), and/or the like).

4. Exemplary Service Control Point

In one embodiment, one or more service control points ("SCP") 115 can be used in conjunction with embodiments of the present invention. The SCP 115 may include one or more components that are functionally similar to those described above. For example, in one embodiment, the SCP 115 may include (1) one or more processing elements, (2) memory, (3) a network interface, (4) an antenna, (5) transceiver, and/or (6) various other components. As will be recognized, the SCP 115 may support a variety of network types (e.g., wired, wireless, and/or the like) and various communications standards and protocols (e.g., GSM, UMTS, CDMA, GPRS, EDGE, CDMA, CAMEL, SIP, and/or the like).

5. Additional Exemplary Entities

As indicated, the communication system in FIG. 1 may include one or more origination switches 120, one or more IPXs 125, one or more destination switches 130, and one or more PSTNs 135. Each of these entities may have one or more of the above-described components, such as (1) processing elements, (2) memory, (3) network interfaces, (4) transceivers, and/or (5) various other components. As will be recognized, each of these entities may support a variety of network types and various communications standards and protocols.

Figure 2:
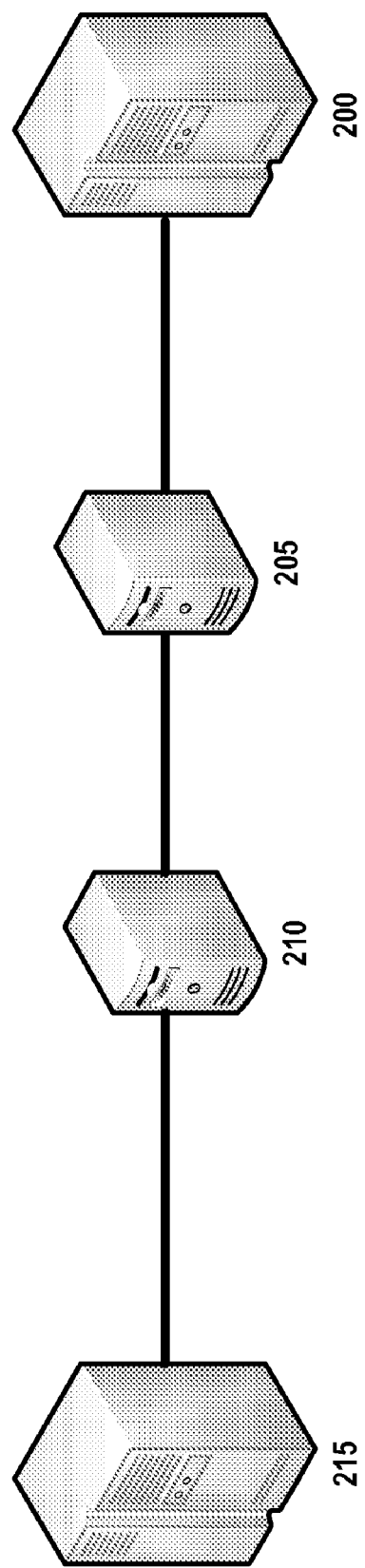
FIG. 2 is an overview of a billing system that can be used to practice various embodiments of the present invention.

FIG. 2 provides an illustration of a billing system that can be used in conjunction with various embodiments of the present invention. As shown in FIG. 2, the billing system may include a visited operator billing system 200, a clearinghouse billing system 205, a record processing billing system 210, and a home operator billing system 215. Each of these entities may have one or more of the above-described components, such as (1) processing elements, (2) memory, (3) network interfaces, (4) transceivers, and/or (5) various other components. As will be recognized, each of these entities may support a variety of network types and various communications standards and protocols.

III. EXEMPLARY SYSTEM OPERATION

Reference will now be made to FIGS. 5-10. FIGS. 5-8 provide flowcharts illustrating operations that may be performed for re-routing calls. FIG. 9 provides an exemplary communication flow for re-routing calls, and FIG. 10 provides an exemplary communication flow for call sessions.

The following sections describe embodiments of the present invention in the context of a GSM/UMTS implementation. However, as will be recognized, embodiments of the present invention can be used with various other communications standards and protocols.

1. Exemplary Initiation of Call

Figure 5:
FIGS. 5-8 are flowcharts illustrating operations and processes that can be used in accordance with various embodiments of the present invention.

In one embodiment, as indicated in Block 500 of FIG. 5, the process may begin with a mobile station 105 initiating a call. In a particular embodiment, the call is a voice call to a non-local number, but may generally be any type of communication. A non-local number may be, for example, a telephone number associated with a country, region, or area that is not within the country, region, or area from which the mobile station 105 initiates the call. For example, a roaming subscriber operating a mobile station 105 in Santiago, Chile may initiate a call to a fixed number in the Los Angeles, Calif. (e.g., a non-local number). Under normal circumstances, a visited operator in Santiago, Chile may charge a high rate (e.g., $2.26 per minute) to the subscriber's home operator for the subscriber's call, while not providing the home operator with any control over the cost, quality, and/or roaming experience of the subscriber. Thus, in various embodiments, the home operator may wish to re-route the call to a local number that it operates. A local number may be, for example, a telephone number associated with a country, region, or area that is within the country, region, or area from which the mobile station 105 initiates the call. Thus, continuing with the above example, a local number may be a number associated with country of Chile, the Santiago Metropolitan Region, or the city of Santiago itself. In certain embodiments, re-routing the call to a local number may provide the home operator with more control over the cost, quality, and/or roaming experience of the subscriber.

Figure 6:
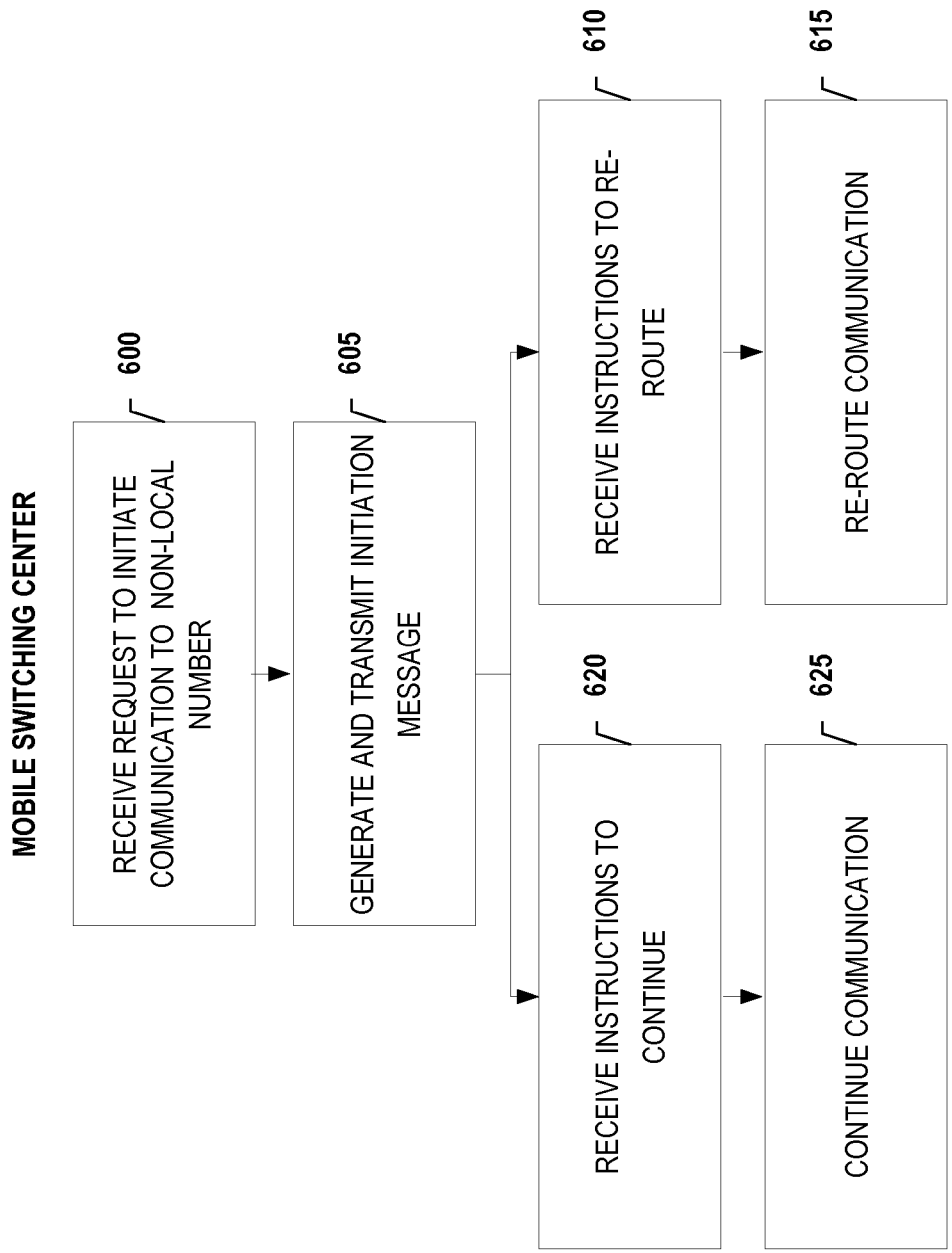

As indicated in Block 600 of FIG. 6, in one embodiment, initiation of the call may include the mobile station 105 transmitting a request (e.g., a call setup message) to the MSC 110. The MSC 110 can receive the request (e.g., a call setup message) to initiate the call from the mobile station 105 to the non-local number. In response, the MSC 110 can generate and transmit an initiation message (such as an Initial Detection Point ("IDP") message) to the SCP 115 (FIG. 9 and Block 605 of FIG. 6). For example, in one embodiment, the CAMEL initial detection point DP2 (Collected_Info) can be used as the trigger detection point ("TDP") in the Originating CAMEL Subscription Information ("O-CSI").

Figure 7:
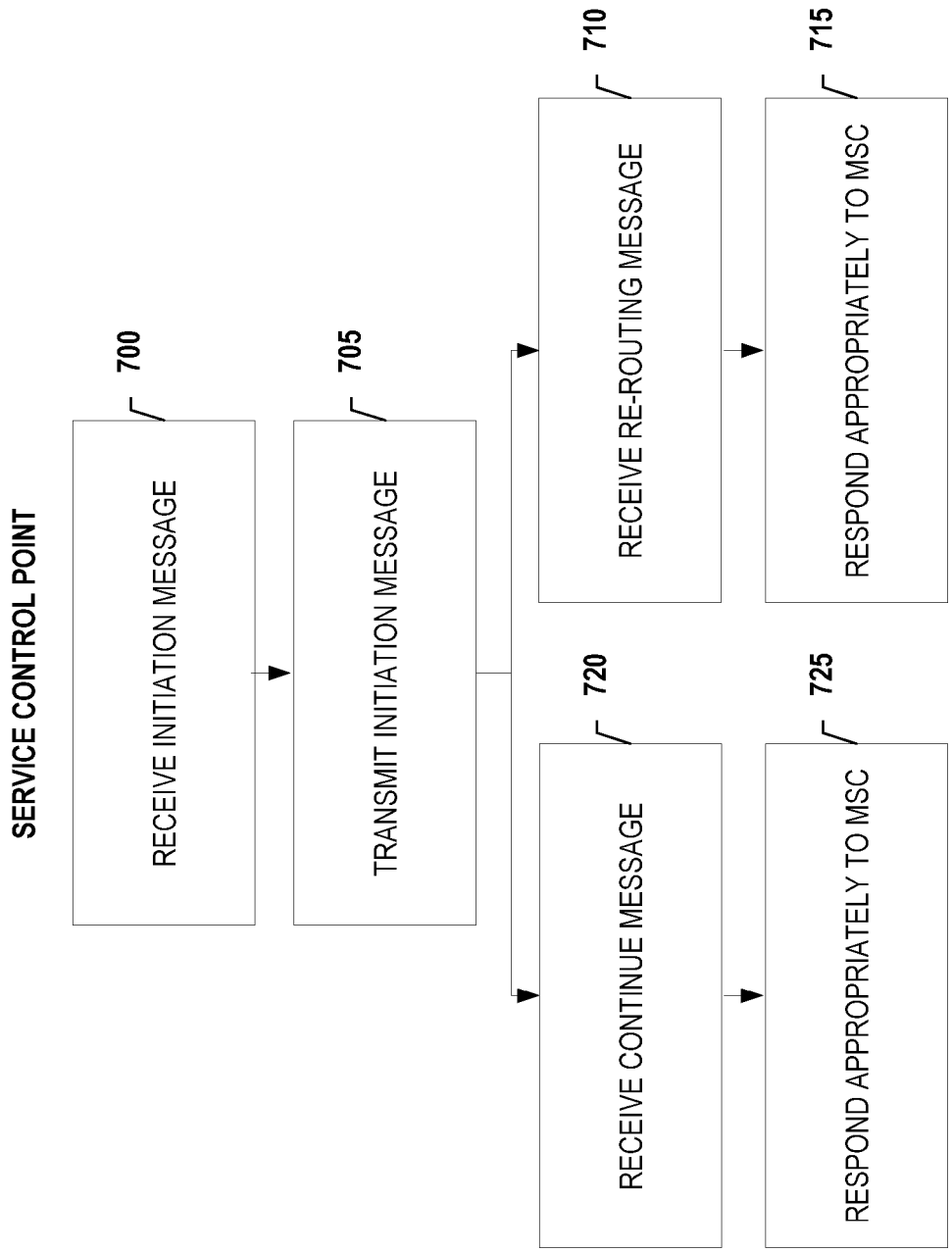

As shown in Block 700 of FIG. 7, the SCP 115 receives the initiation message (e.g., IDP message) from the MSC 110. After receiving the initiation message (e.g., IDP message), the SCP 115 may apply a variety of pre-process services corresponding to the mobile station 105, such as prepaid services, dialed digit correction services, and/or the like. In addition to applying pre-process services, the SCP 115 may determine whether to forward the initiation message (or at least some of the information contained therein) to the call server 100 for further processing. For example, in one embodiment, the SCP 115 may be configured to forward initiation messages (e.g., IDP messages or at least some of the information contained therein) to the call server 100 for calls to non-local numbers, e.g., international or long distance calls. In one embodiment, after determining that the initiation message (e.g., IDP message or at least some of the information contained therein) should be forwarded to the call server 100, the SCP 115 transmits the initiation message (or at least some of the information contained therein) to the call server 100 (FIG. 9 and Block 705 of FIG. 7). In one embodiment, forwarding the initiation message from the SCP 115 to the call server 100 may comprise transmitting only some of the information contained in the initiation message from the MSC 110. In other embodiments, the entire initiation message may be forwarded from the SCP 115 to the call server 100.

2. Exemplary Processing Initiation of Call

In one embodiment, the call server 100 may execute various functions associated with the call initiated by the mobile station 105.

a. Exemplary Receipt of Initiation Message

Figure 8:
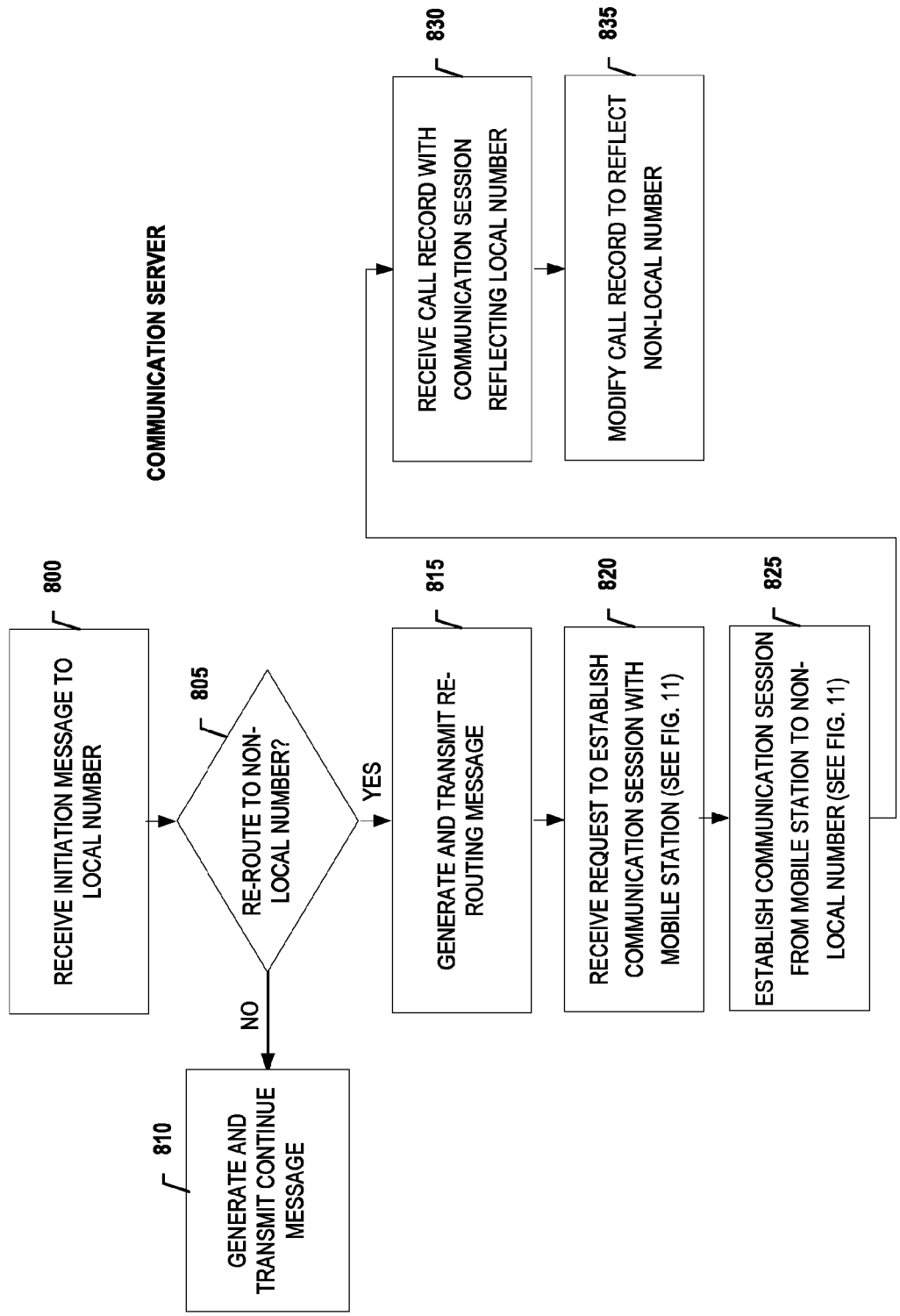

In one embodiment, the call server 100 receives the initiation message from the SCP 115 indicating that the mobile station 105 has initiated the call to the non-local number (Block 800 of FIG. 8). To receive such messages, the call server 100 may be configured to communicate with the SCP 115 (or other entities) using one or more interfaces. By way of example, in one embodiment, the call server 100 may communicate with the SCP 115 using a variety of standards and protocols, such as the Hypertext Transfer Protocol ("HTTP").

Thus, for instance, the call server 100 may receive the initiation message (e.g., IDP message or at least some of the information contained therein) from the SCP 115 via an HTTP GET message that includes a "callid" correlation field and IDP call information fields. Exemplary fields are shown below in Table 1. Table 1 includes uniform resource identifier ("URI") fields and CAMEL field names.

TABLE 1

| URI FIELD | CAMEL FIELD NAME | REQUIRED |
|---|---|---|
| callid | N/A | Y |
| cledp | calledPartyNumber (non-local number) | Y |
| corcledp | calledPartyNumber (called number after modification by SCP 115, prior to re-routing) | Y |
| clingp | callingPartyNumber | Y |
| crefn | callReferenceNumber | N |
| locn | locationNumber | N |
| cgi | locationInformation.cellGlobalIdentity | N |
| cledpbcd | calledPartyBCDNumber | N |
| ocledp | originalCalledPartyID | N |
| aclingp | additionalCallingPartyNumber | N |
| imsi | iMSI | N |
| mscaddr | mscAddress | Y |
| timz | timeAndTimezone | Y |

In one embodiment, upon receipt of the initiation message (e.g., IDP message or at least some of the information contained therein), the call server 100 may store data corresponding to the non-local number in association with data corresponding to the mobile station 105. For example, the call server 100 may create a timed cache entry associated with the initiation message (e.g., IDP message or at least some of the information contained therein) and/or the mobile station 105. The period of time after which the timed cache entry expires may vary, such as 30 seconds. Thus, if the call server 100 does not receive an appropriate request (e.g., receive a request to establish a call session with the mobile station 105 originating from the local number) for the timed cache entry within the predetermined time, the timed cache entry may expire. Similarly, subsequent initiation messages (e.g., IDP messages or at least some of the information contained therein) for the mobile station 105 may overwrite existing cache values associated with the initiation message (e.g., IDP message) and/or the mobile station 105.

b. Exemplary Re-Route or Continue Determination

In one embodiment, in response to (e.g., after) receiving the initiation message from the SCP 115 (and/or in response to selecting a local number as discussed below), the call server 100 may determine whether the call from the mobile station 105 to the non-local number is to be re-routed to a local number (Block 805 of FIG. 8). In other embodiments, though, the SCP 115 may determine whether the call should be re-routed. As will be recognized a variety of approaches and techniques may be used.

In one embodiment, to determine whether the call should be re-routed, the call server 100 may be configured to consider various factors. For example, the call server 100 may re-route calls based at least in part on the calling market (e.g., the market in which the mobile station 105 initiates the call as indicated by the MSC address), the called market (e.g., the market of the non-local number), the time of day (e.g., time tables), and/or the like. Additionally or alternatively, in making such determinations, the call server 100 may be configured to consider the location of the mobile station 105, the called country, the time of day, the desired percentage of calls to re-route, and the current network capacity utilization of certain resources. For instance, the call server 100 may be configured to re-route calls during peak or off-peak times of day or if the network capacity utilization is below a predetermined threshold.

In certain embodiments, if a savings may be effected by re-routing, the call server 100 may re-route the call to, for example, a local VoIP-IN number. For instance, re-routing the call to a local number may provide the home operator with more control over the cost, quality, and/or roaming experience of the subscriber. In one embodiment, the local number may be a Voice over Internet Protocol Inbound ("VoIP-IN") phone number operated by the home operator (or the visited operator), such as a direct inward dial number ("DID"). Such a configuration may allow the home operator to (a) control roaming subscribers' call quality and roaming experience and (b) reduce inter-operator tariff charges. For example, by re-routing the call to a local VoIP-IN number, the home operator may be able to provide the call to the subscriber at a reduced cost to the home operator, such as for $0.38 per minute instead of $2.26 per minute. Thus, in this example, the home operator may be able to provide the call to the subscriber at a savings of $1.88 per minute.

c. Exemplary Local Number Selection and Pools

In one embodiment, the call server 100 may select a local number to re-route the call to from a pool of local numbers and store the local number in the timed cache entry before, after, or simultaneous to determining whether to re-route the call. In one embodiment, to do so, the call server 100 may have access to various pools of numbers, such as least-recently-used pools of numbers corresponding to various markets. For example, in one embodiment, the call server 100 may select a least-recently-used local VoIP-IN number nearest in proximity (or best oriented) with regard to the mobile station's 105 location—as indicated in the initiation message (e.g., IDP message or at least some of the information contained therein). In one embodiment, the local number pools may be provisioned by country codes, region codes, and/or area codes. For example, in selecting a local number, the call server 100 may first attempt to identify a local number having the same area code as the MSC 110. If a local number having the same area code as the MSC 110 is not available, the call server 100 may attempt to identify a local number having the same country code as the MSC 110. If a local number having the same country code as the MSC 110 is not available, the call server 100 may attempt to identify a local number having the same region code as the MSC 110. As will be recognized, though, a variety of other techniques and approaches may also be used.

In one embodiment, the home operator may own and/or operate some (or all) of the local numbers used for call re-routing. In another embodiment, the visited operator may own and/or operate some (or all) of the local numbers used for call re-routing. For example, the home operator and the visited operator may have a relationship with regard to providing services to the home operator's roaming subscribers. In such an embodiment, the visited operator may provide the home operator with access to local VoIP numbers that, for example, can be used to re-route calls to non-local numbers initiated from the home operator's subscribers while roaming within the visited operator's territory. Thus, calls to non-local numbers initiated by the home operator's subscribers can be re-routed to local numbers (e.g., soft switches) owned and/or operated by the visited operator (ultimately for establishing a call session from the mobile station 105 to the non-local number).

In one embodiment, the number dialed by the subscriber may be found to be a number known to the home operator representing some service to which calls are frequently forwarded, such as a Voice Mail Voice Response Unit ("VRU") or Pre-Pay VRU. Such call forward scenarios may be handled via dedicated local numbers.

In one embodiment, in addition to selecting the local number from a pool of local numbers, the call server 100 may lock the local number for a predetermined period of time and store the local number in the timed cache entry associated with the initiation message and/or the mobile station 105. With regard to locking the local number, the lock on the local number may expire when the time cached entry expires. Similarly, the local number may be released back to the pool in response to (e.g., after) appropriate actions or events. For example, if the call server 100 receives a request to establish a call session with the mobile station 105 originating from the local number, the call server 100 may release the local number back to the appropriate local number pool. In one embodiment, the relation between a particular subscriber making a call to a non-local number and a particular local number used may be stored in the call server 100 for a period of time, such that a subsequent call made by this same subscriber within this time period will cause the server to not reuse the same local number for that subscriber.

This example describes an embodiment in which the call server 100 selects a local number after determining that the call is to be re-routed. In another embodiment, the call server 100 selects a local number in response to (e.g., after) receiving the initiation message (e.g., IDP message or at least some of the information contained therein). As will be recognized, though, a variety of other techniques and approaches may also be used.

In one embodiment, the call server 100 can also maintain periodic statistics of local number pool usage. In various embodiments, this may allow for predictive capacity analysis for internal capacity management. Similarly, the statistics may help the home operator avoid instances of number exhaustion from the local number pools. As will be recognized, a variety of other techniques and approaches may also be used.

d. Exemplary Re-Routing and Continue Messages

In one embodiment, in response to (e.g., after) determining whether the call from the mobile station 105 to the non-local number is to be re-routed to a local number, the call server 100 responds to the SCP 115 with the appropriate response. In one embodiment, in response to (e.g., after) determining that the call from the mobile station 105 to the non-local number is not to be re-routed to a local number, the call server 100 may generate and transmit a continue message to the SCP 115 (FIG. 9 and Block 810 of FIG. 8). The continue message may be, for example, a message instructing the SCP 115 that the call is to continue on its normal call path.

In one embodiment, in response to (e.g., after) determining that the call from the mobile station 105 to the non-local number is to be re-routed to a local number, the call server 100 may generate and transmit a re-routing message to the SCP 115 (Block 815 of FIG. 8). The re-routing message may be, for example, a message instructing the SCP 115 that the call is to be re-routed to a local number. The re-routing message may include a variety of information, such as the selected local VoIP-IN number to which the call should be re-routed.

e. Exemplary Re-Routing or Continuing Call

In one embodiment, the SCP 115 receives the continue message or the re-routing message from the call server 100 (Blocks 710, 720 of FIG. 7). After receiving the continue message or the re-routing message, the SCP 115 can apply any post-process services (if any) and respond appropriately to the MSC 110 (FIG. 9).

In one embodiment, in response to (e.g., after) the receiving a continue message from the call server 100, the SCP 115 responds appropriately to the MSC 110 (Block 725 of FIG. 7). For example, the SCP 115 can provide continue instructions to the MSC 110. Thus, in this example, the MSC 110 receives the instructions from the SCP 115 and continues the call on its normal call path (Blocks 620, 625 of FIG. 6).

In one embodiment, in response to (e.g., after) the receiving a re-routing message from the call server 100, the SCP 115 responds appropriately to the MSC 110 (Block 715 of FIG. 7). For example, the SCP 115 can provide re-routing instructions to GSM Service Switching Function ("gsmSSF") using "Connect" to re-route the call to the local number (e.g., VoIP-IN number) specified in "Destination Routing Address." Thus, in this example, the MSC 110 receives the re-routing instructions from the SCP 115 and re-routes the call to the local number (Blocks 610, 615 of FIG. 6). Accordingly, in one embodiment, the MSC 110 may establish ISDN User Part ("ISUP") Initial Address Message ("IAM") towards the local number (e.g., VoIP-IN number).

Although the foregoing describes an implementation in which the call server 100 determines whether the call from the mobile station 105 to the non-local number is to be re-routed to a local number, this is only one embodiment. For example, in another example, the SCP 115 may make such a determination and provide the appropriate information to the MSC 110 accordingly. As will be recognized, a variety of other techniques and approaches may also be used.

3. Exemplary Establishment of Call Session

The following describes the establishment of a call session from the mobile station 105 to the non-local number. In particular, as shown in FIG. 1, the following describes establishing a call session using SIP, the origination switch 120, the IPX 125, and the destination switch 130. However, as will be recognized, a variety of other approaches, networks, techniques, standards, and protocols may be used.

In one embodiment, after the MSC 110 re-routes the call to the local number, the local number may deliver the call signaling to call server 100. For example, in one embodiment, the local number may be a phone number associated with an origination switch 120 that is configured to initiate call sessions with the call server 100 for all calls re-routed to it by the MSC 110. Accordingly, in one embodiment, the local number (e.g., via signaling from the origination switch 120) generates and transmits a request to establish a call session with the mobile station 105. Correspondingly, as indicated in Block 1000 of FIG. 10 and Block 820 of FIG. 8, the call server 100 receives the request to establish a call session originating from the local number (e.g., the origination switch 120), for example, through the IPX 125. In a particular embodiment, the request to establish a call session originating from the local number is a SIP INVITE to establish a call session between the call server 100 and the local number.

In one embodiment, in response to (e.g., after) receiving the request to establish a call session with the mobile station 105 originating from the local number (e.g., the origination switch 120), the call server 100 identifies data it is storing that corresponds to the local number as a result of having re-routed the call to the local number. As previously discussed, the call server 100 may, for example, store data corresponding to the local number in association with (a) data from the initiation message (e.g., including the non-local number) and/or (b) data corresponding to the mobile station 105 (Block 1002 of FIG. 10). Thus, for instance, the timed cache entry stored by the call server 100 may include (a) data from the initiation message (e.g., including the non-local number), (b)

data corresponding to the mobile station 105, and/or (c) data corresponding to the local number.

In one embodiment, as indicated in Block 1004 of FIG. 10, in response to (e.g., after) identifying data corresponding to the local number, the call server 100 may complete establishment of a call session from the mobile station 105 to the non-local number, as indicated in Block 825 of FIG. 8. For example, Blocks 1000, 1002, 1006, 1008, 1010, 1012, 1014, and 1018 of FIG. 10 provide an exemplary communication flow for establishing a call session from the mobile station 105 to the non-local number. Blocks 1000 and 1002 have been previously discussed.

In one embodiment, to establish a call session from the mobile station 105 to the non-local number, the call server 100 may generate and transmit a request to establish a call session to the non-local number (e.g., through the IPX 125), such as by signaling to the destination switch 130 associated with non-local number. The destination switch 130 may be an entity capable of delivering the call to the non-local number. In a particular embodiment, the request to establish a call session to the non-local number is a SIP INVITE to establish a call session between the call server 100 and the non-local number.

In one embodiment, as indicated the Block 1006 of FIG. 10, the call server 100 can receive trying (SIP 100), ringing (SIP 180), and session progress (SIP 183) signaling from the non-local number (e.g., signaling from the destination switch 130). Similarly, as indicated in Block 1008, in response to (e.g., after) receiving these communications from the non-local number (e.g., destination switch 130), the call server 100 can transmit trying (SIP 100), ringing (SIP 180), and session progress (SIP 183) signaling to the local number (e.g., the origination switch 120). As indicated the Block 1010 of FIG. 10, the non-local number (e.g., destination switch 130) can accept the call session by, for example, transmitting a SIP OK message to the call server 100. Correspondingly, as indicated in Block 1012 of FIG. 10, the call server 100 can accept the call session with the local number (e.g., origination switch 120) by transmitting a SIP OK message to the local number (e.g., origination switch 120). The call session from the mobile station 105 to the non-local number may then be established by, for example, the local number (e.g., origination switch 120) transmitting a SIP ACK to the call server 100 and the call server 100 transmitting a SIP ACK to the non-local number (e.g., destination switch 130)—shown in Blocks 1014, 1018 of FIG. 10. Thus, in this embodiment, the call server 100 can establish the call session from the mobile station 105 to the non-local number. As will be recognized, though, a variety of techniques and approaches may be used.

In one embodiment, the call server 100 only executes the call session creation and the call session termination, but does not manage the packetized voice transmissions between the mobile station 105 and the non-local number. In such an embodiment, the voice packets may flow between the mobile station 105 and the non-local number through the IPX 125, for example. In another embodiment, though, in addition to establishing the call session, the call server 100 can manage and monitor the call session from the mobile station 105 to the non-local number. For example, the call server 100 can manage the packetized voice transmissions between the mobile station 105 and the non-local number. In either embodiment, as shown in Blocks 1020, 1024, 1026, and 1028 of FIG. 10, the call server 100 can manage the termination of the call session via, for example, SIP signaling with the local number (e.g., origination switch 120) and the non-local number (e.g., destination switch 130). As will be recognized, a variety of other techniques and approaches may be used.

In one embodiment, as the establishment of the call session progresses and/or the call session terminates, the call server 100 can store data corresponding to the call session at various intervals in the process (see, e.g., Blocks 1002, 1016, 1022 of FIG. 10). In one embodiment, data corresponding to the call session is stored in association with (a) data corresponding to the local number and (b) data corresponding to the mobile station.

4. Exemplary Modification of Call Record

In one embodiment, because (a) the call is re-routed by the MSC 110 from the non-local number to the local number and (b) the call session from the mobile station 105 to the non-local number is established by the call server 100, the call record (such as a Transfer Account Procedure ("TAP") record) from the visited operator indicates that the mobile station 105 called the local number. A pre-modification call record is shown below in Table 2. As shown in Table 2, the call record indicates that the local number was the number called by the mobile station 105.

TABLE 2

| RECORD FIELD | PRE-MODIFICATION INFORMATION |
|---|---|
| Dialed Digits | 0014233330000 (non-local number) |
| Called Number | 33 12 000 0000 (local number) |
| CAMEL Destination Number | 33 12 000 0000 (local number) |

In certain embodiments, the home operator may desire to modify the call record to indicate that the mobile station 105 initiated the call to the non-local number. For example, as shown in FIG. 2, the visited operator (e.g., via a visited operator billing system 200) may transmit call records to a clearinghouse billing system 205 for settlement. In one embodiment, the clearinghouse billing system 205 can transmit call records (all call records for a particular operator or all re-routed call records for a particular operator) to a record processing billing system 210, such as a record processing billing system 210 operated by a third party. The record processing billing system 210 can receive the call records (Block 830 of FIG. 8) and modify the call records of the re-routed calls. In this example, the modification of the call record is to indicate that the mobile station 105 initiated the call to the non-local number (Block 835 of FIG. 8). For example, for re-routed calls, the dialed digits can be copied into the called number and CAMEL Destination Number fields. A post-modification call record is shown below in Table 2.

TABLE 3

| RECORD FIELD | POST-MODIFICATION INFORMATION |
|---|---|
| Dialed Digits | 0014233330000 (non-local number) |
| Called Number | 14233330000 (non-local number) |
| CAMEL Destination Number | 14233330000 (non-local number) |

In an embodiment in which the dialed digits may not be present or may contain a short code value, a feed of call detail records from the call server 100 can be used to correct the TAP Called Number and CAMEL Destination Number fields to the non-local number dialed by the subscriber. Moreover, in one embodiment, a dedicated local number may be recognized in TAP from a local market such that a static association can be used to replace the local number value in the Called Number and CAMEL Destination Number fields with a specific international number representing a some sort of service offered by the home operator, such as a Voice Mail or Pre-Pay VRU.

In one embodiment, after modifying the call record, the record processing billing system 210 can transmit the call records to the home operator billing system 215. The home operator billing system 215 can then charge the various subscribers for the calls. In various embodiments, this approach may provide the home operator with more control over the cost, quality, and/or roaming experience of the subscriber.

5. Exemplary Alternative Concepts

As will be recognized, a variety of other approaches and techniques can be used to provide home operators with more control over the cost, quality, and/or roaming experience of their subscribers.

a. Exemplary SMS or USSD Concepts

In one embodiment, initiation of the call may be performed by the mobile station 105 using SMS or USSD protocols and/or standards. For example, in one embodiment, the mobile station 105 may initiate a call to a non-local number by transmitting an SMS or USSD message (e.g., an initiation message) to the home operator (e.g., call server 100) and/or the visited operator (e.g., call server 100). The initiation message (e.g., SMS or USSD message) may include the non-local number to which the mobile station 105 wishes to establish a call session. In one embodiment, in response to (e.g., after) receiving the initiation message from the mobile station 105, the appropriate operator (e.g., call server 100) may determine whether the call from the mobile station 105 to the non-local number is to be re-routed to a local number, such as described above. For example, in response to (e.g., after) determining whether the call from the mobile station 105 to the non-local number is to be re-routed to a local number, the appropriate operator (e.g., call server 100) can respond with the appropriate response to the mobile station 105.

In one embodiment, in response to (e.g., after) determining that the call from the mobile station 105 to the non-local number is not to be re-routed to a local number, the appropriate operator (e.g., call server 100) may generate and transmit a continue message (e.g., an SMS or USSD message) to the mobile station 105. The continue message may be, for example, a message instructing the mobile station 105 that the call is to continue on its normal call path.

In one embodiment, in response to (e.g., after) determining that the call from the mobile station 105 to the non-local number is to be re-routed to a local number, the appropriate operator (e.g., call server 100) may generate and transmit a re-routing message (e.g., an SMS or USSD message) to the mobile station 105. The re-routing message may be, for example, a message (e.g., an SMS or USSD message) instructing the mobile station 105 that the call is to be re-routed to a local number. The re-routing message (e.g., SMS or USSD message) may include a variety of information, such as the selected local VoIP-IN number to which the call should be re-routed.

In one embodiment, after the mobile station 105 receives the re-routing message, the mobile station 105 (e.g., via an application, user input, and/or the like) can use the local number from the re-routing message (e.g., via an SMS or USSD message) to ultimately establish a call session from the mobile station 105 to the non-local number. For example, the call session may be established via the appropriate operator (e.g., call server 100) as described above. As will be recognized, though, a variety of other approaches and techniques may be used.

b. Exemplary DTMF Concepts

In one embodiment, initiation of a call to a non-local number may be performed by the mobile station 105 using DTMF concepts. For example, in one embodiment, the mobile station 105 may initiate a call to a non-local number. To do so, the mobile station 105 (e.g., via an application, user input, SIM dialer, and/or the like) may first call a local number (e.g., a preprogrammed, predetermined, or dynamically-identified local number) associated with the country, region, or area that is within the country, region, or area in which the mobile station 105 is located, for example. In one embodiment, the home operator (e.g., call server 100) and/or the visited operator (e.g., call server 100) can receive the call via the local number and then present a dial tone to the caller (e.g., the mobile station 105). In response to (e.g., after) the dial tone being presented, the mobile station 105 (e.g., via an application, user input, SIM dialer, and/or the like) can provide the non-local number to the appropriate operator (e.g., call server 100) via the local number. The appropriate operator (e.g., call server 100) can then establish a call session with the non-local number as described above, for example.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for re-routing a call from a mobile station, the method comprising:

receiving, via a call server, an initiation message indicating that a mobile station has initiated a call to a non-local number;

after receiving the initiation message indicating that the mobile station has initiated the call to the non-local number, determining, via the call server, whether the call from the mobile station to the non-local number is to be re-routed to a local number;

after a determination that the call from the mobile station to the non-local number is not to be re-routed to a local number, generating a continue message;

after a determination that the call from the mobile station to the non-local number is to be re-routed to a local number, (a) generating, via the call server, a re-routing message and (b) storing, via the call server, data corresponding to the local number in association with (i) data corresponding to the non-local number and (ii) data corresponding to the mobile station based at least in part on the re-routing message;

receiving, via the call server, a request to establish a call session originating from the local number; and after receiving, via the call server, the request to establish a call session originating from the local number, establishing a call session from the mobile station to the non-local number based at least in part on the stored data.

2. The method of claim 1, wherein the re-routing message comprises the local number.

3. The method of claim 1 further comprising locking the local number from a pool of local numbers.

4. The method of claim 3, after establishing the call session from the mobile station to the non-local number, releasing the local number to the pool of local numbers.

5. The method of claim 3, after a predetermined period of time elapsing, releasing the local number to the pool of local numbers.

6. The method of claim 1 further comprising storing data corresponding to the non-local number in association with data corresponding to the mobile station.

7. The method of claim 6, wherein establishing the call session from the mobile station to the non-local number further comprises identifying data corresponding to the non-local number stored in association with data corresponding to the mobile station.

8. The method of claim 7, wherein (a) the call session is for a voice call and (b) the local number is local to the area in which the mobile station initiates the call.

9. The method of claim 6 further comprising:
receiving a call record associated with the mobile station, wherein the call record indicates that the mobile station initiated the call to the local number; and
modifying the call record to indicate that the mobile station initiated the call to the non-local number.

10. An apparatus comprising at least one processor and at least one memory including computer program code, the at least one memory and the computer program code configured to, with the processor, cause the apparatus to at least:
receive an initiation message indicating that a mobile station has initiated a call to a non-local number;
after receiving the initiation message indicating that the mobile station has initiated the call to the non-local number, determine whether the call from the mobile station to the non-local number is to be re-routed to a local number;
after a determination that the call from the mobile station to the non-local number is not to be re-routed to a local number, generate a continue message;
after a determination that the call from the mobile station to the non-local number is to be re-routed to a local number, (a) generate a re-routing message and (b) store data corresponding to the local number in association with (i) data corresponding to the non-local number and (ii) data corresponding to the mobile station based at least in part on the re-routing message;
receive a request to establish a call session originating from the local number; and
after receiving the request to establish a call session originating from the local number, establishing a call session from the mobile station to the non-local number based at least in part on the stored data.

11. The apparatus of claim 10, wherein the memory and computer program code are further configured to, with the processor, cause the apparatus to lock the local number from a pool of local numbers.

12. The apparatus of claim 11, wherein the memory and computer program code are further configured to, with the processor, cause the apparatus to, after establishing the call session from the mobile station to the non-local number, release the local number to the pool of local numbers.

13. The apparatus of claim 11, wherein the memory and computer program code are further configured to, with the processor, cause the apparatus to, after a predetermined period of time elapsing, release the local number to the pool of local numbers.

14. The apparatus of claim 10, wherein the memory and computer program code are further configured to, with the processor, cause the apparatus to store data corresponding to the non-local number in association with data corresponding to the mobile station.

15. The apparatus of claim 14, wherein establishing the call session from the mobile station to the non-local number further comprises identifying data corresponding to the non-local number stored in association with data corresponding to the mobile station.

16. The apparatus of claim 15, wherein (a) the call session is for a voice call and (b) the local number is local to the area in which the mobile station initiates the call.

17. The apparatus of claim 14, wherein the memory and computer program code are further configured to, with the processor, cause the apparatus to:
receive a call record associated with the mobile station, wherein the call record indicates that the mobile station initiated the call to the local number; and
modify the call record to indicate that the mobile station initiated the call to the non-local number.

18. A computer program product for re-routing a call from a mobile station via a call server executing the computer program product, the computer program product comprising at least one non-transitory computer-readable storage medium having computer-readable program code portions stored therein, the computer-readable program code portions comprising:
an executable portion configured to receive an initiation message indicating that a mobile station has initiated a call to a non-local number;
an executable portion configured to, after receiving the initiation message indicating that the mobile station has initiated the call to the non-local number, determine whether the call from the mobile station to the non-local number is to be re-routed to a local number;
an executable portion configured to, after a determination that the call from the mobile station to the non-local number is not to be re-routed to a local number, generate a continue message;
an executable portion configured to, after a determination that the call from the mobile station to the non-local number is to be re-routed to a local number, (a) generate a re-routing message and (b) store data corresponding to the local number in association with (i) data corresponding to the non-local number and (ii) data corresponding to the mobile station based at least in part on the re-routing message;
an executable portion configured to receive a request to establish a call session originating from the local number; and
an executable portion configured to, after receiving the request to establish a call session originating from the local number, establish a call session from the mobile station to the non-local number based at least in part on the stored data.

19. The computer program product claim 18 further comprising an executable portion configured to lock the local number from a pool of local numbers.

20. The computer program product claim 19 further comprising an executable portion configured to, after establishing the call session from the mobile station to the non-local number, release the local number to the pool of local numbers.

21. The computer program product claim 20 further comprising an executable portion configured to, release the local number to the pool of local numbers.

22. The computer program product claim 18 further comprising an executable portion configured to store data corresponding to the non-local number in association with data corresponding to the mobile station.

23. The computer program product claim 22, wherein establishing the call session from the mobile station to the non-local number further comprises identifying data corresponding to the non-local number stored in association with data corresponding to the mobile station.

24. The computer program product claim 23, wherein (a) the call session is for a voice call and (b) the local number is local to the area in which the mobile station initiates the call.

25. The computer program product claim 22 further comprising an executable portion configured to:

receive a call record associated with the mobile station, wherein the call record indicates that the mobile station initiated the call to the local number; and modify the call record to indicate that the mobile station initiated the call to the non-local number.

\* \* \* \* \*